US007814123B2

(12) United States Patent
Nguyen et al.

(10) Patent No.: US 7,814,123 B2
(45) Date of Patent: Oct. 12, 2010

(54) MANAGEMENT OF COMPONENT MEMBERS USING TAG ATTRIBUTES

(75) Inventors: Thomas Ngoc Nguyen, Westminster, CA (US); George Philip Bauer, III, San Juan Capistrano, CA (US)

(73) Assignee: Siemens Aktiengesellschaft, Munich (DE)

( * ) Notice: Subject to any disclaimer, the term of this patent is extended or adjusted under 35 U.S.C. 154(b) by 788 days.

(21) Appl. No.: 11/004,493

(22) Filed: Dec. 2, 2004

(65) Prior Publication Data

US 2006/0123019 A1 Jun. 8, 2006

(51) Int. Cl.
*G06F 7/00* (2006.01)
(52) U.S. Cl. ...................................................... 707/796
(58) Field of Classification Search ........................ None
See application file for complete search history.

(56) References Cited

U.S. PATENT DOCUMENTS

| 5,907,704 | A | 5/1999 | Gudmundson et al. |
| 5,970,476 | A | 10/1999 | Fahey |
| 5,982,362 | A | 11/1999 | Crater et al. |
| 6,003,036 | A | 12/1999 | Martin |
| 6,198,480 | B1 | 3/2001 | Cotugno et al. |
| 6,223,182 | B1 | 4/2001 | Agarwal et al. |
| 6,336,138 | B1 | 1/2002 | Caswell et al. |
| 6,381,605 | B1 | 4/2002 | Kothuri et al. |
| 6,430,565 | B1 | 8/2002 | Berger et al. |
| 6,480,836 | B1 | 11/2002 | Colby et al. |
| 6,505,205 | B1 | 1/2003 | Kothuri et al. |
| 6,505,246 | B1 * | 1/2003 | Land et al. ................... 709/224 |
| 6,609,123 | B1 | 8/2003 | Cazemier et al. |
| 6,700,590 | B1 * | 3/2004 | DeMesa et al. .............. 715/744 |
| 6,704,743 | B1 | 3/2004 | Martin |
| 6,751,657 | B1 | 6/2004 | Zothner |
| 6,842,774 | B1 | 1/2005 | Piccioni |
| 6,952,705 | B2 | 10/2005 | Knoblock et al. |
| 6,996,566 | B1 | 2/2006 | George et al. |
| 7,069,514 | B2 | 6/2006 | DeMesa |
| 7,133,865 | B1 | 11/2006 | Pedersen et al. |
| 7,275,024 | B2 | 9/2007 | Yeh et al. |
| 7,523,111 | B2 | 4/2009 | Walmsley |
| 2001/0040591 | A1 * | 11/2001 | Abbott et al. ................ 345/700 |
| 2002/0099499 | A1 | 7/2002 | Takayama et al. |
| 2002/0169867 | A1 | 11/2002 | Mann et al. |
| 2002/0184610 | A1 | 12/2002 | Chong et al. |
| 2003/0055832 | A1 | 3/2003 | Roccaforte |
| 2003/0058277 | A1 | 3/2003 | Bowman-Amuah |
| 2003/0105857 | A1 * | 6/2003 | Kamen et al. ................ 709/224 |
| 2003/0139968 | A1 | 7/2003 | Ebert |
| 2004/0036716 | A1 | 2/2004 | Jordahl |
| 2004/0059436 | A1 | 3/2004 | Anderson et al. |
| 2004/0117393 | A1 | 6/2004 | DeMesa et al. |

(Continued)

*Primary Examiner*—Don Wong
*Assistant Examiner*—Belinda Xue
(74) *Attorney, Agent, or Firm*—Buckley, Maschoff & Talwalkar LLC

(57) ABSTRACT

A system to associate a plurality of members with a component, associate a member type with one of the plurality of members, and associate a value tag attribute with the one of the plurality of members. Some aspects include receipt of an instruction to access data associated with a member of a component, determination of whether the member is associated with a first tag attribute, and issuance, if the member is associated with the first tag, of a first query for the data associated with the member of the component and for data associated with each other member of the component that is associated with a respective tag attribute.

46 Claims, 11 Drawing Sheets

U.S. PATENT DOCUMENTS

| | | |
|---|---|---|
| 2004/0162834 A1 | 8/2004 | Aono et al. |
| 2004/0215626 A1 | 10/2004 | Colossi et al. |
| 2004/0220972 A1 | 11/2004 | Bhattacharjee et al. |
| 2004/0243281 A1 | 12/2004 | Fujita et al. |
| 2005/0021622 A1 | 1/2005 | Cullen |
| 2005/0044097 A1 | 2/2005 | Singson et al. |
| 2005/0065910 A1 | 3/2005 | Welton et al. |
| 2005/0071749 A1 | 3/2005 | Goerke et al. |
| 2005/0143969 A1 | 6/2005 | DeMesa et al. |
| 2005/0144154 A1 | 6/2005 | DeMesa et al. |
| 2005/0172306 A1 | 8/2005 | Agarwal et al. |
| 2005/0216555 A1 | 9/2005 | English et al. |
| 2005/0246627 A1 | 11/2005 | Sayed |
| 2005/0251571 A1 | 11/2005 | Karstens |
| 2006/0031250 A1 | 2/2006 | Henigman et al. |
| 2006/0067334 A1 | 3/2006 | Ougarov et al. |
| 2006/0074505 A1 * | 4/2006 | Kline, Jr. .................... 700/96 |
| 2006/0116994 A1 | 6/2006 | Jonker et al. |
| 2006/0123019 A1 | 6/2006 | Nguyen et al. |
| 2006/0136583 A1 | 6/2006 | Helmstetter et al. |
| 2006/0161597 A1 | 7/2006 | Ougarov et al. |
| 2006/0200741 A1 | 9/2006 | DeMesa |
| 2006/0218116 A1 | 9/2006 | O'Hearn et al. |
| 2006/0218131 A1 | 9/2006 | Brenes et al. |
| 2006/0294199 A1 | 12/2006 | Bertholf |
| 2007/0118599 A1 | 5/2007 | Castanho et al. |
| 2007/0124209 A1 | 5/2007 | Walker et al. |
| 2007/0208574 A1 | 9/2007 | Zheng et al. |
| 2007/0239741 A1 | 10/2007 | Jordahl |
| 2008/0103786 A1 | 5/2008 | Zhang et al. |

* cited by examiner

Component: Plant
| Members | Member Type |
|---|---|
| Area1 | Area |

Component: Area
| Members | Member Type |
|---|---|
| IntakePump | Pump |
| OutletPump | Pump |
| Conveyer1 | Conveyer |
| Conveyer2 | Conveyer |

Component: Pump
| Members | Member Type |
|---|---|
| Status | Boolean |
| Pressure1 | Pressure |

Component: Conveyer
| Members | Member Type |
|---|---|
| Status | Boolean |
| Speed1 | Speed |

Component: Speed
| Members | Member Type | Tag Attribute |
|---|---|---|
| hiLimit | Integer | None |
| CurrentValue | Integer | None |
| Unit | String | None |

Component: Pressure
| Members | Member Type | Tag Attribute |
|---|---|---|
| hiLimit | Integer | None |
| loLimit | Integer | None |
| CurrentValue | Integer | Value |
| Unit | String | Units |
| Description | String | Description |

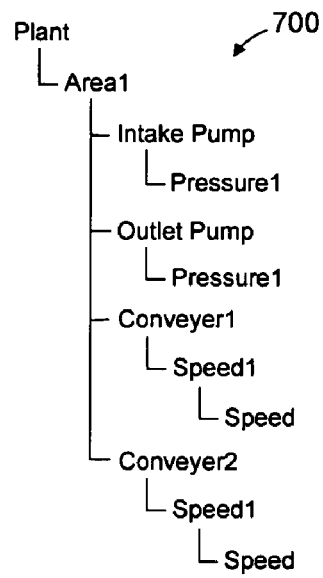

FIG. 5

MANAGEMENT OF COMPONENT MEMBERS USING TAG ATTRIBUTES

CROSS REFERENCE TO RELATED APPLICATIONS

This application is related to commonly-assigned U.S. patent application Ser. No. 10/993,712, now issued as U.S. Pat. No. 7,698,292, filed Nov. 19, 2004, and entitled "TAG MANAGEMENT WITHIN A DECISION, SUPPORT, AND REPORTING ENVIRONMENT.

BACKGROUND

1. Field

The embodiments described below relate generally to the access of data associated with component members.

2. Discussion

Modern industrial systems often rely to some extent on computer-based automation and monitoring. In some examples of monitoring and automation, data arising from the operation of a manufacturing plant is acquired, analyzed and responded to if necessary. The data may arise from independent sources, with each source configured to provide substantially "raw" or "native" information at pre-defined intervals in real or near real-time. The information may consist of numerical values produced by gauges and/or monitors (e.g., speed, temperature, or pressure). Data of this type is often referred to as "point" data.

Examples of systems that may acquire, store and distribute data include industrial automation systems, supervisory control and data acquisition (SCADA) systems, general data acquisition systems, and plant data historians. Many of these conventional systems associate point data with "tags". These tags may be accessed by other systems, applications and/or users. A tag may also include "non-point" data that provides context to its related point data. Non-point data may include descriptive information characterizing the point data, as well as other information such as limits, ranges, etc.

The above-mentioned commonly-assigned patent application and U.S. Pat. No. 6,700,590 describe systems to use a class-based object and view model to collect and display data received from multiple heterogeneous sources. These systems encapsulate the received data as objects, or components. As such, data associated with an aspect of an industrial system may be represented within a component, along with other data associated with the same aspect. The use of components may provide reusability, consistency, inheritance and other benefits known to those familiar with object-oriented techniques.

It is desired, however, to increase the efficiency by which data associated with component members is accessed. It is also desired to provide satisfactory interoperation between a class-based component and view model and a system that uses tags to associate point data with related non-point data.

SUMMARY

In order to address the foregoing, some embodiments concern a system, a method, an apparatus, a medium storing processor-executable process steps, and means to define a component. Such definition may comprise association of a plurality of members with the component, association of a member type with one of the plurality of members, and association of a value tag attribute with the one of the plurality of members. In further aspects, a query is received to access data associated with each of the plurality of members that is associated with a tag attribute, and a database is queried for the data associated with each of the plurality of members that is associated with a tag attribute.

In other aspects, a user interface to define a component provides a member interface to associate a plurality of members with the component, a member type interface to associate a member type with one of the plurality of members, and a tag attribute interface to associate a value tag attribute with the one of the plurality of members.

Some aspects include receipt of an instruction to access data associated with a member of a component, the member being associated with a member type, determination of whether the member is associated with a first tag attribute, and, if the member is associated with the first tag attribute, issuance of a first query for the data associated with the member of the component and for data associated with each other member of the component that is associated with a respective tag attribute. In a case that the member is not associated with the first tag attribute, a second query may be issued for the data associated with the member of the component.

Some embodiments relate to an administration device, a server device, and a user device. The administration device is to associate a plurality of members with a component, associate a member type with one of the plurality of members, and associate a value tag attribute with the one of the plurality of members, and the server device is to display the component in a component model. The user device is to receive an instruction to access data associated with the one of the plurality of members, to determine that the one of the plurality of members is associated with the value tag attribute, and to issue a first query to the server device for the data associated with the one of the plurality of members and for data associated with each other of the plurality of members of the component that is associated with a respective tag attribute.

The appended claims are not limited to the disclosed embodiments, however, as those in the art can readily adapt the teachings herein to create other embodiments and applications.

BRIEF DESCRIPTION OF THE DRAWINGS

The construction and usage of embodiments are set forth in the accompanying drawings, in which like reference numerals designate like parts, and wherein:

FIG. 5 illustrates a component model according to some embodiments;

DETAILED DESCRIPTION

Figure 1:
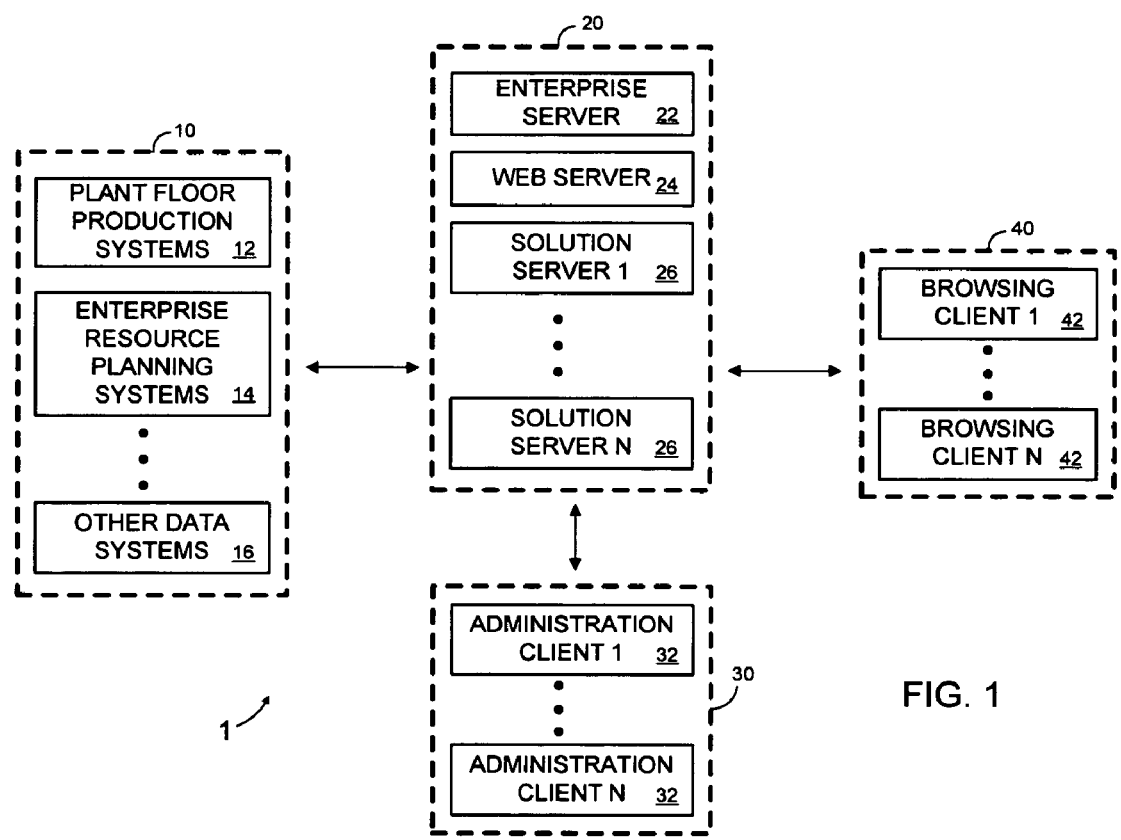
FIG. 1 is a block diagram of a system architecture according to some embodiments.

FIG. 1 illustrates an architecture of system 1 according to some embodiments. It should be noted that other architectures may be used in conjunction with other embodiments. System 1 includes back-end data environment 10 in communication with application environment 20. Also in communication with application environment 20 are administration environment 30 and browsing environment 40.

As used herein, systems "in communication" with one another are directly or indirectly capable of communicating over any number of different systems ports, interfaces, etc. for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Back-end data environment 10 comprises various data sources, such as plant floor production systems 12, enterprise resource planning data systems 14, and other data systems 16. Data arising from the back-end data environment 10 may comprise point data such as the aforementioned operational values and non-point data used to characterize, contextualize, or identify the point data and/or point data source. Each data source of back-end data environment 10 may comprise many disparate hardware and software systems, some of which may not be interoperable with one another.

Application environment 20 may issue queries for data to back-end data environment 10. In response, back-end data environment 10 acquires and transmits the data to application environment 20. Such communication may employ any system for querying and responding that is or becomes known.

Application environment 20 may comprise enterprise server 22, Web server 24, and/or one or more solution servers 26. Application environment 20 may comprise or be integrated as components of a single server device or multiple devices. In various embodiments, enterprise server 22 and solution servers 26 may comprise application programs developed, for example, using Java and/or C++ and running under, for example, operating systems such as the Windows™ family of operating systems.

Application environment 20 may include storage (not shown) for storing definitions of components. A component represents one or more data sources and contains information associated with the data source(s). A component may represent any data source for which back-end environment 10 acquires data.

A component is made up of one or more members. For example, a "customer" component may be comprised of members such as name, identification number and address. Each member of a component is associated with a member type. Member types may include, for example, a number, a date, a text string, a Boolean logical value, or another component.

According to some embodiments, one or more members of a component may be associated with a tag attribute. Non-exhaustive examples of tag attributes include a value tag attribute, a units tag attribute, a description tag attribute, a key tag attribute, a high limit tag attribute, and a low limit tag attribute. A tag component is a component having at least one component member that is associated with a tag attribute. The definition of tag components and the use thereof will be discussed in detail below.

A run-time usage of a component is called a component instance. When a component is reused, a unique instance of that component is created, with a unique name. Different instances of the same component can follow different instructions on where, when, how and how often to retrieve associated data from back-end environment 10.

Solution servers 26 are used to access data from back-end environment 10 that is associated with an instance of a component. In some embodiments, solution servers 26 include solutions and connectors. A solution is an object instance that is associated with particular data of back-end environment 10. A connector comprises processor-executable process steps to populate such an object instance with the particular data. Solution servers 26 thereby allow application environment to access data that is acquired and stored by disparate systems of back-end environment 10.

Web server 24 manages data communication between application environment 20, administration environment 30, and browsing environment 40. This data communication may include interaction with administration environment 30 to define a component model including tag components and non-tag components. Web server 24 may also or alternatively interact with browsing environment 40 to receive queries for data associated with component members and to transmit the data to browsing environment 40. As will be described below, the query may result from a request by a user for a particular view of a component. For instance, one or both of administration environment 30 and browsing environment 40 may execute one or more Java applets to interact with Java servlets of Web server 24 according to some embodiments.

Administration environment 30 comprises one or more administration clients 32. Each administration client 32 may comprise processor-executable process steps executed by a respective administration device. An administration client 32 may provide an interface that presents a component model including each defined component. By selecting a component from the component model, an administrator may modify the definition of the selected component, create a new view for the component, and/or edit a view for the component. The administration client 32 may transmit the modified components and views to enterprise server 22 for storage.

An administration client 32 may also allow an administrator to create or modify a solution and its associated connector to back-end data sources. In some embodiments, system 1 supports Microsoft's Dynamic Data Exchange (DDE) protocol and Microsoft's Open Database Connectivity (ODBC) application programming interface for connecting to data sources of back-end environment 10.

In a case that an administration client 32 comprises a Web browser or a Java applet, a respective administration device may comprise any currently- or hereafter-known device capable of executing such a browser or applet. Examples of administration devices according to some embodiments include, but are not limited to, a desktop computer, a laptop computer, a computer terminal, a personal digital assistant, a telephone, and a tablet computer.

Browsing environment 40 comprises one or more browsing clients 42. Each browsing client 42 may comprise processor-executable process steps executed by a respective user device. A browsing client 42 may provide an interface to access component views. A component view presents data associated with component values to a user. Examples of component views will be discussed below with respect to FIGS. 8 through 12.

Briefly, a browsing client 42 may receive an instruction to access data associated with a member of a component, determine whether the member is associated with a first tag attribute, and, if the member is associated with the first tag attribute, issue a first query for the data associated with the member of the component and for data associated with each other member of the component that is associated with a respective tag attribute. In a case that the member is not associated with the first tag attribute, a second query may be issued for the data associated with the member of the component. In some embodiments, such a system may increase the efficiency by which data associated with tag components is displayed.

A browsing client 42 may comprise a communication application such as a Web browser or a Java applet. As such, a browsing client 42 may be connected to application environment 20 through the Internet or through an Intranet. A browsing client 42 may comprise any other suitable software application according to some embodiments. Browsing clients 42 may be executed by any suitable user device, including but not limited to those mentioned above with respect to administration environment 30. In some embodiments, a same device may be used to execute an administration client 32 and a browsing client 42.

The environments of FIG. 1 may be connected differently than as shown, and each block shown may be implemented by one or more hardware and software elements. The various hardware and software elements of one or more blocks may be located remotely from each other or integrated together. Some embodiments may include environments, systems, servers, and clients that are different from those shown.

Figure 2:
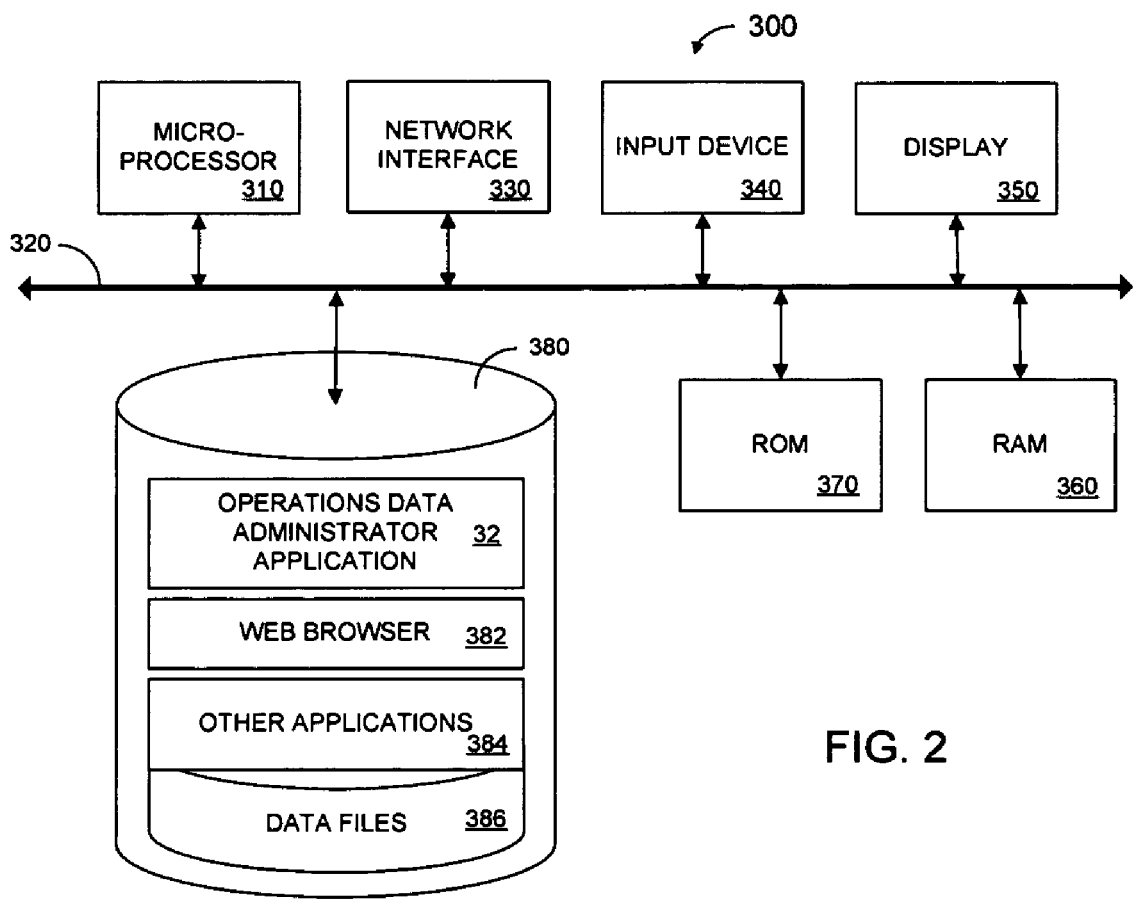
FIG. 2 is a block diagram illustrating an internal architecture of an administration device according to some embodiments.

FIG. 2 is a block diagram of an internal architecture of administration device 300 according to some embodiments. Administration device 300 may operate to associate a plurality of members with the component, to associate a respective member type with at least one of the plurality of members, and to associate a value tag attribute with one of the plurality of members.

In at least one embodiment, administration device 300 includes microprocessor 310 in communication with communication bus 320. Microprocessor 310 may comprise a Pentium™ microprocessor or other type of processor and is used to execute processor-executable process steps so as to control the elements of administration device 300 to provide desired functionality.

Also in communication with communication bus 320 is communication port 330. Communication port 330 is used to transmit data to and to receive data from devices external to administration device 300 such as a device housing enterprise server 22 and/or Web server 24. Such data may include component models, component definitions, and view definitions. Communication port 330 is therefore preferably configured with hardware suitable to physically interface with desired external devices and/or network connections. For example, communication port 330 may comprise an Ethernet connection to a local area network through which administration device 300 may receive and transmit information over a network.

Input device 340 and display 350 are also in communication with communication bus 320. Any known input device may comprise input device 340, including a keyboard, mouse, touch pad, voice-recognition system, or any combination of these devices. Of course, information may also be input to administration device 300 via communication port 330. Display 350 may be an integral or separate CRT (Cathode Ray Tube) display, flat-panel display or the like used to present graphics and text in response to commands issued by microprocessor 310.

Figure 4:
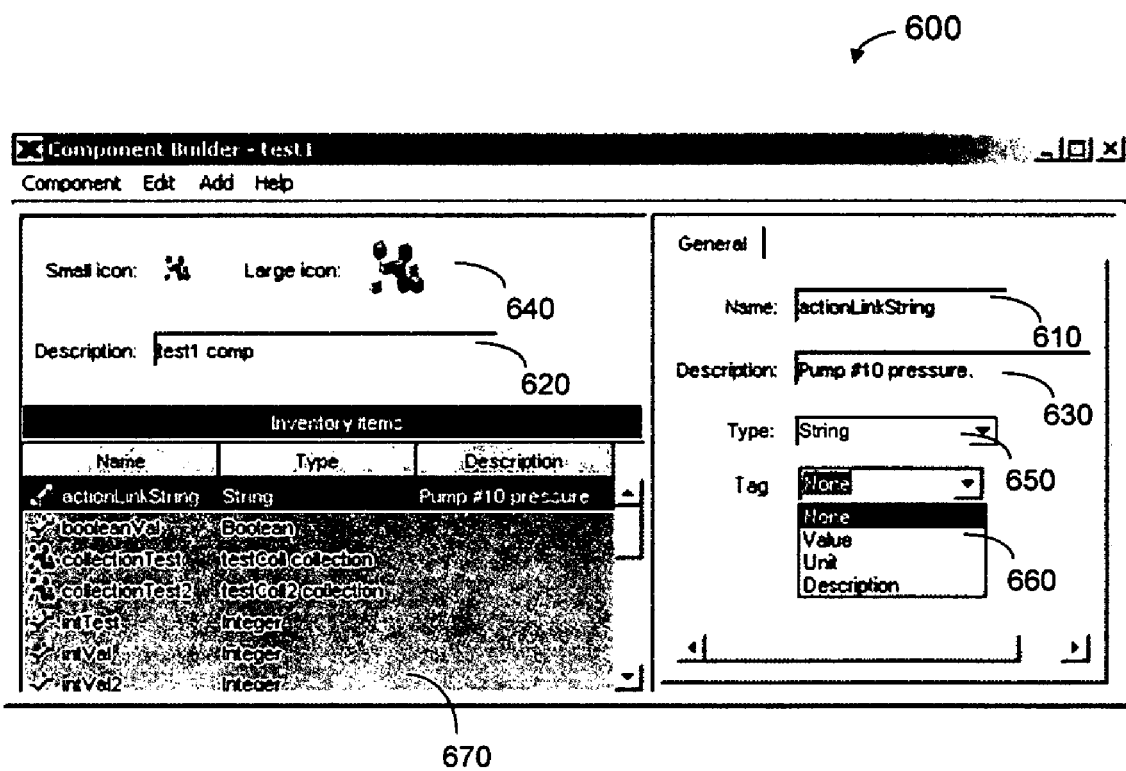
FIG. 4 is an outward view of an interface to associate a tag attribute with a component member according to some embodiments.

According to some embodiments, display 350 presents a user interface to define a component. The user interface, an example of which is shown in FIG. 4, may include a member interface to associate a plurality of members with the component, a member type interface to associate a member type with one of the plurality of members, and a tag attribute interface to associate a value tag attribute with the one of the plurality of members.

RAM (Random Access Memory) 360 is connected to communication bus 320 to provide microprocessor 310 with fast data storage and retrieval. In this regard, processor-executable process steps being executed by microprocessor 310 are typically stored temporarily in RAM 360 and executed therefrom by microprocessor 310. ROM (Read Only Memory) 370, in contrast, provides storage from which data can be retrieved but to which data cannot be stored. Accordingly, ROM 370 may be used to store invariant process steps and other data, such as basic input/output instructions and data used during boot-up of administration device 300 or to control communication port 330. One or both of RAM 360 and ROM 370 may communicate directly with microprocessor 310 instead of over communication bus 320.

Data storage device 380 stores, among other data, processor-executable process steps of operations data administrator application 32. Operations data administrator application 32 may comprise an implementation of an administration client 32 and is therefore labeled similarly. Administration device 300 may execute process steps of operations data administrator application 32 to associate a plurality of members with a component, to associate a member type with one of the plurality of members, and to associate a value tag attribute with the one of the plurality of members. Operations data administrator application 32 may comprise a Java applet or a standalone application suitable for the operating system of administration device 300.

Web browser 382 may comprise processor-executable process steps of a Web client. As such, administration device 300 may execute process steps of Web browser 382 to request and receive Web pages from a Web server such as Web server 24. A Java applet such as operations data administrator application 32 may execute within an execution engine provided by Web browser 382.

Data storage device 380 also includes processor-executable process steps of other applications 384. Other applications 384 may include process steps to perform calendaring, e-mail functions, word processing, accounting, presentation development and the like. Data storage device 380 may also store process steps of an operating system (not shown). An operating system provides a platform for executing applications, device drivers and other process steps that interact with elements of administration device 300. Data files 386 may include any electronic files usable by any application of administration device 300.

Figure 3:
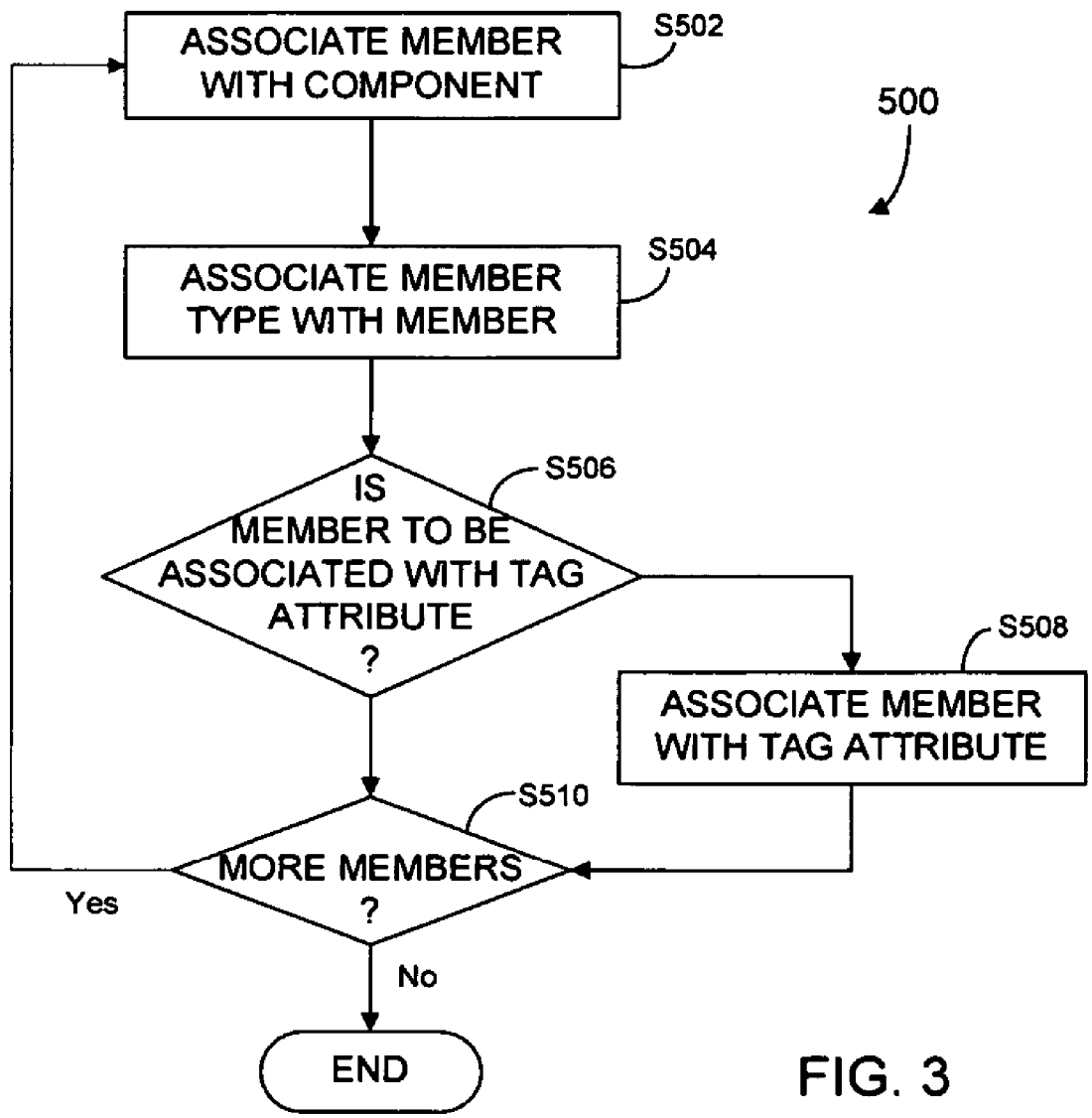
FIG. 3 illustrates a flow diagram of process steps to associate members with a component according to some embodiments.

FIG. 3 illustrates process steps 500 to define a component according to some embodiments. Process steps 500 are described below as if embodied in operations data administrator application 32 and executed by microprocessor 310 of administration device 300. However, process steps 500 may be embodied in one or more software or hardware elements and executed, in whole or in part, by any device or by any number of devices in combination, including a server device embodying enterprise server 22. Moreover, some or all of process steps 500 may be performed manually.

Process steps 500 may be executed to associate a plurality of members with a component, to associate a member type with one of the plurality of members, and to associate a value tag attribute with the one of the plurality of members. In some embodiments, process steps 500 may also be executed to associate a second plurality of members with a second component, the second plurality of members comprising the component, and to associate a respective member type with at least one of the second plurality of member, wherein no tag attribute is associated with any of the second plurality of members.

A member is associated with a component at step S502. Component Builder dialog 600 of FIG. 4 is a user interface that may be used to associate a member with a component according to some embodiments of step S502. Component Builder dialog 600 may be displayed on display 350 in response to an instruction to edit an existing component or to define a new component.

For example, administration device 300 may execute process steps of operations data administrator application 32 to request a component model from Web server 24. Web server 24 then retrieves and transmits the component model to administration device 300, where the component model is displayed on display 350. An administrator may then use input device 340 to select a component of the displayed component model, thereby causing display of Component Builder dialog 600. Operations data administrator application 32 receives data associated with the selected component from Web server 24, and populates the fields of dialog 600 with the data. In a case that Component Builder dialog 600 was displayed in response to a request to define a new component, the fields of dialog 600 may initially be empty.

Member interface 610 may be used to associate a member with the subject component at step S502. For example, entry of a member name in interface 610 may result in an association between a member having the member name and the component named in interface 620. A description may also be associated with the member using interface 630. In a case that a new component is being defined at step S502, an administrator may also enter the component name in interface 620 and use interface 640 to define an icon that will be associated with the component within the displayed component model mentioned above.

A member type is then associated with the member at S504. Interface 650 of dialog 600 provides a pull-down menu that may be manipulated by the administrator to associate a member type with the member named in interface 610. Available member types according to some embodiments include Integer, Date, String, Boolean, or Component.

It is then determined at step S506 whether the member is to be associated with a tag attribute. If so, the member is associated with a tag attribute at step S508. According to the FIG. 4 example, manipulation of interface 660 indicates that the member is to be associated with a tag attribute. The member is associated with a tag attribute in a case that a tag attribute is selected from the pull-down menu of interface 660. Available tag attributes in the present example include None, Value, Unit, and Description. Tag attributes according to some embodiments also or alternatively include Key, High limit, and Low limit.

According to some embodiments, a tag component is a component having at least one component member that is associated with a tag attribute. Some embodiments allow only one member of a component to be associated with a given tag attribute. For example, only one member of a tag component may be associated with a Value tag attribute and only one other member of the tag component may be associated with a Description tag attribute.

In some embodiments of step S508, an administrator may select "Add" in Component Builder dialog 600 to pass the member, member type, tag attribute, and description to application environment 20. Application environment 20 may store the member, member type, tag attribute, and description in association with one another and in association with an existing or new component of the component model. The member, member type, and description may also or alternatively be displayed in display area 630 of dialog 600. Display area 630 of FIG. 4 shows that members "collectionTest" and "collectionTest2" of component "test1 comp" are themselves components. In some embodiments, display area 630 may graphically indicate any component members that are associated with tag attributes. Flow continues from step S508 to step S510.

Flow proceeds directly from step S506 to step S510 if no members are to be associated with tag attributes. Flow then proceeds from step S510 to step S502 if more members are to be associated with the component. If no more members are to be associated with the component, process 500 terminates.

FIG. 5 illustrates a component model according to some embodiments. Each component includes at least one member, and each component member is associated with a member type. A member of a first component may be a second component, in which case the associated member type is the name of the second component. All members that are associated with "primitive" member types (which include anything other than another component) are either associated with a tag attribute or not (i.e. "None").

The component Pressure includes at least one primitive member type that is associated with a tag attribute. The component Pressure is therefore referred to herein as a tag component. According to some embodiments, tag components are not displayed within a component model to which they belong.

Component model 700 of FIG. 5 is shown in a tree or hierarchical format which facilitates visualization and understanding of the relationships and patterns of inheritance/instantiations for the various component definitions of FIG. 5. Component model 700 may therefore be displayed to an administrator or user according to some embodiments. As explained, only non-tag components are included in component model 700.

Figure 6:
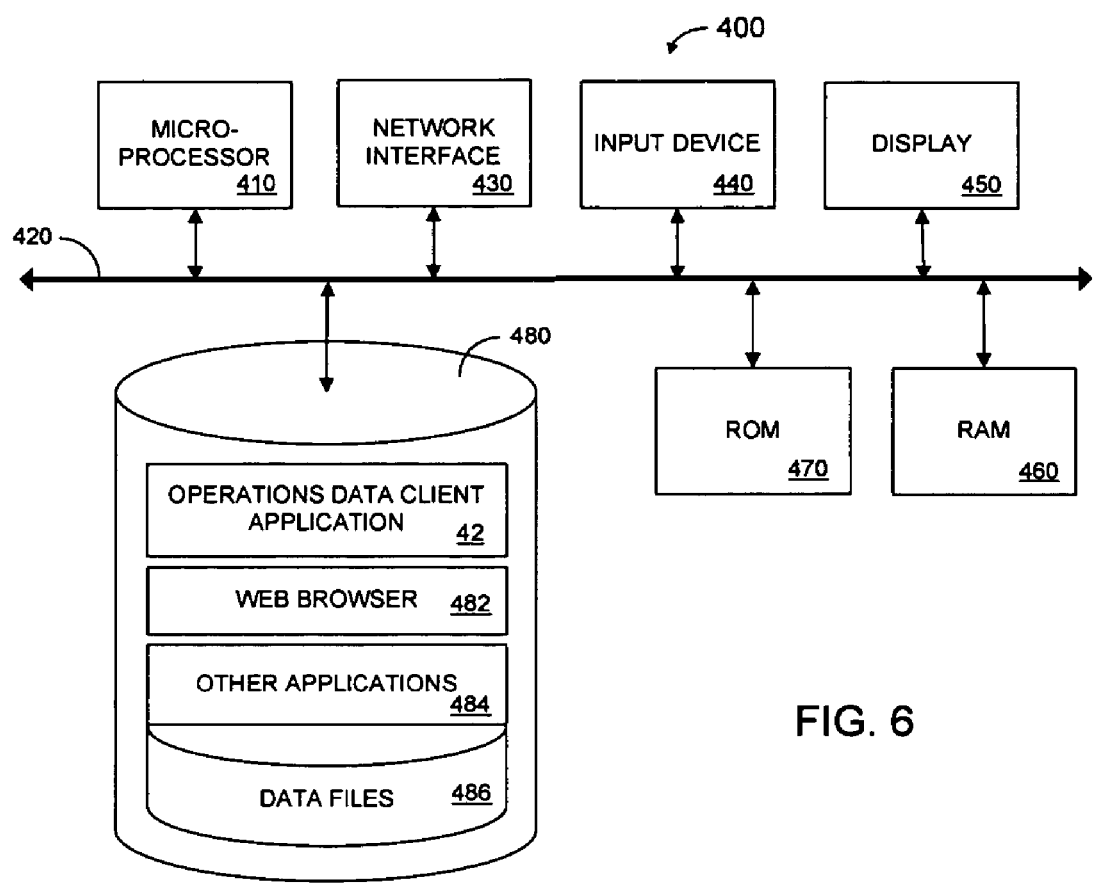
FIG. 6 is a block diagram illustrating an internal architecture of a user device according to some embodiments.

FIG. 6 is a block diagram of an internal architecture of user device 400 according to some embodiments. User device 400 may execute a browsing client 42 of browsing environment 40. The illustrated elements of user device 400 may be implemented as described above with respect to similarly-named elements of administration device 300. Of course, the elements of user device 400 may operate to provide the functionality attributed herein to user device 400.

For example, user device 400 may operate to receive an instruction to access data associated with a member of a component, the member being associated with a member type, determine if the member is associated with a first tag attribute, and, if the member is associated with the first tag attribute, issue a first query for the data associated with the member of the component and for data associated with each other member of the component that is associated with a respective tag attribute. Such operation may provide more efficient data access than previously available.

More particularly, microprocessor 410 may execute process steps stored in user device 400, and communication port 430 may transmit data to and receive data from enterprise server 22 and/or Web server 24. The transmitted data may include requests for component models and views, and queries for data associated with component members. The received data may include component models, views, and data associated with component members. A user may operate input device 440 to request views that are in turn displayed on display 450.

Data storage device 480 stores, among other data, processor-executable process steps of operations data client application 42. Operations data client application 42 may comprise an implementation of a browsing client 42 and is therefore labeled similarly. User device 400 may execute process steps of operations data client application 42 to receive an instruction to access data associated with a member of a component, the member being associated with a member type, determine if the member is associated with a first tag attribute, and, if the member is associated with the first tag attribute, issue a first query for the data associated with the member of the component and for data associated with each other member of the component that is associated with a respective tag attribute. Operations data client application 42 may comprise a Java applet or a standalone application suitable execution by the operating system of user device 400.

Web browser 482 may comprise processor-executable process steps of a Web client. As such, user device 400 may execute process steps of Web browser 482 to request and receive Web pages from a Web server such as Web server 24. Operations data client application 42 may be provided, for instance as a Java applet executing within an execution engine provided by or through Web browser 482.

Data storage device 480 also includes processor-executable process steps of other applications 484. Other applications 484 may include process steps to perform calendaring, e-mail functions, word processing, accounting, presentation development and the like. Data files 486 may include any electronic files usable by any application of user device 400. Data storage device 480 may also store process steps of an operating system (not shown).

The process steps stored in data storage devices 380 and 480 may be read from one or more of a computer-readable medium, such as a floppy disk, a CD-ROM (Compact Disc-Read Only Memory), a DVD-ROM (Digital Video Disc-Read Only Memory), a Zip™ disk, a magnetic tape, or a signal encoding the process steps, and then stored in data storage devices 380 and 480 in a compressed, uncompiled and/or encrypted format. In alternative embodiments, hard-wired circuitry may be used in place of, or in combination with, processor-executable process steps for implementation of processes according to some embodiments. Thus, embodiments are not limited to any specific combination of hardware and software.

Figure 7:
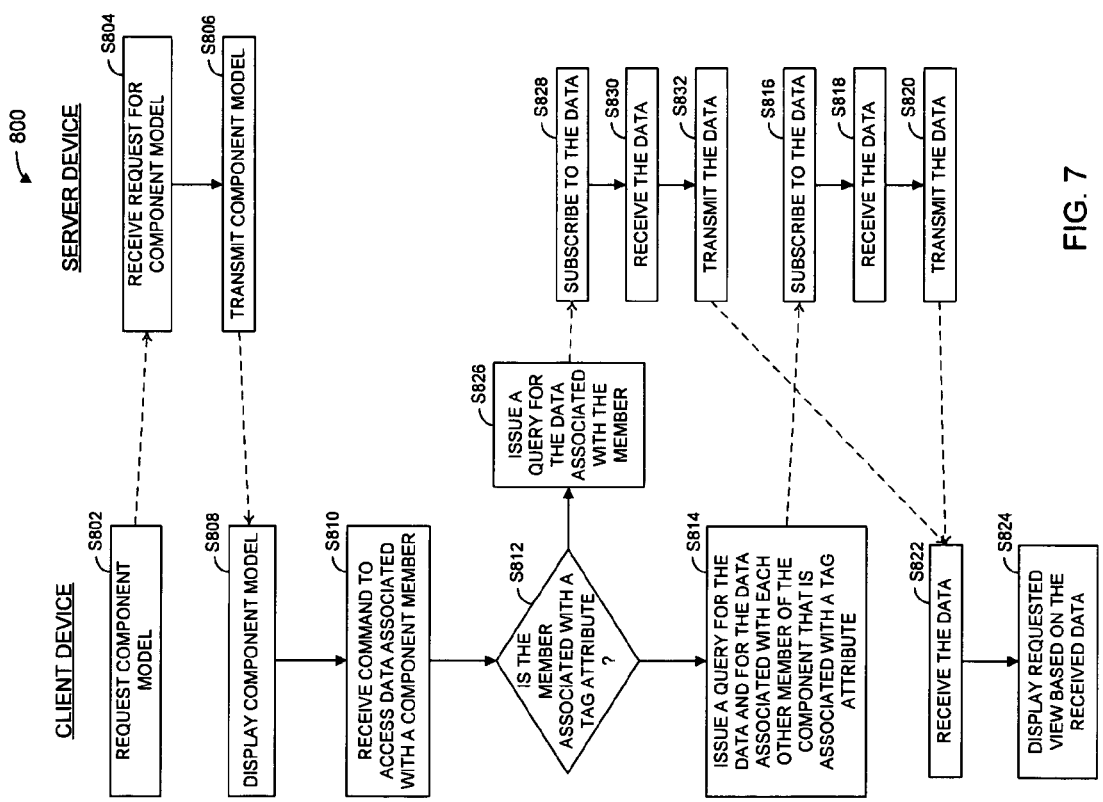
FIG. 7 illustrates a flow diagram of process steps to access data associated with component members according to some embodiments.

FIG. 7 illustrates process steps 800 according to some embodiments. Process steps 800 are described below as if embodied in operations data client application 42 and executed by microprocessor 410 of user device 400. However, process steps 800 may be embodied in one or more software or hardware elements and executed, in whole or in part, by any device or by any number of devices in combination, including administration device 300. Some or all of process steps 800 may be performed manually.

Briefly, process steps 800 may be executed to receive an instruction to access data associated with a member of a component, the member being associated with a member type, determine if the member is associated with a first tag attribute, and, if the member is associated with the first tag attribute, issue a first query for the data associated with the member of the component and for data associated with each other member of the component that is associated with a respective tag attribute.

Initially, at step S802, client device 400 requests a component model from a server device. For purposes of the present example, it will be assumed that the server device includes or otherwise has access to the elements of application environment 20 shown in FIG. 1. In some embodiments of step S802, a user launches operations data client application 42 and manipulates a user interface thereof to instruct application 42 to request the component model. The request is transmitted using the HTTPS (HyperText Transfer Protocol-Secure) protocol according to some embodiments.

The server device receives the request at step S804 and transmits the requested component model to client device 400 at step S806. The request may be received by Web server 24 and passed to enterprise server 22, which in turn acquires the stored component model and passes it to Web server 24 for transmission to client device 400.

Figure 8:
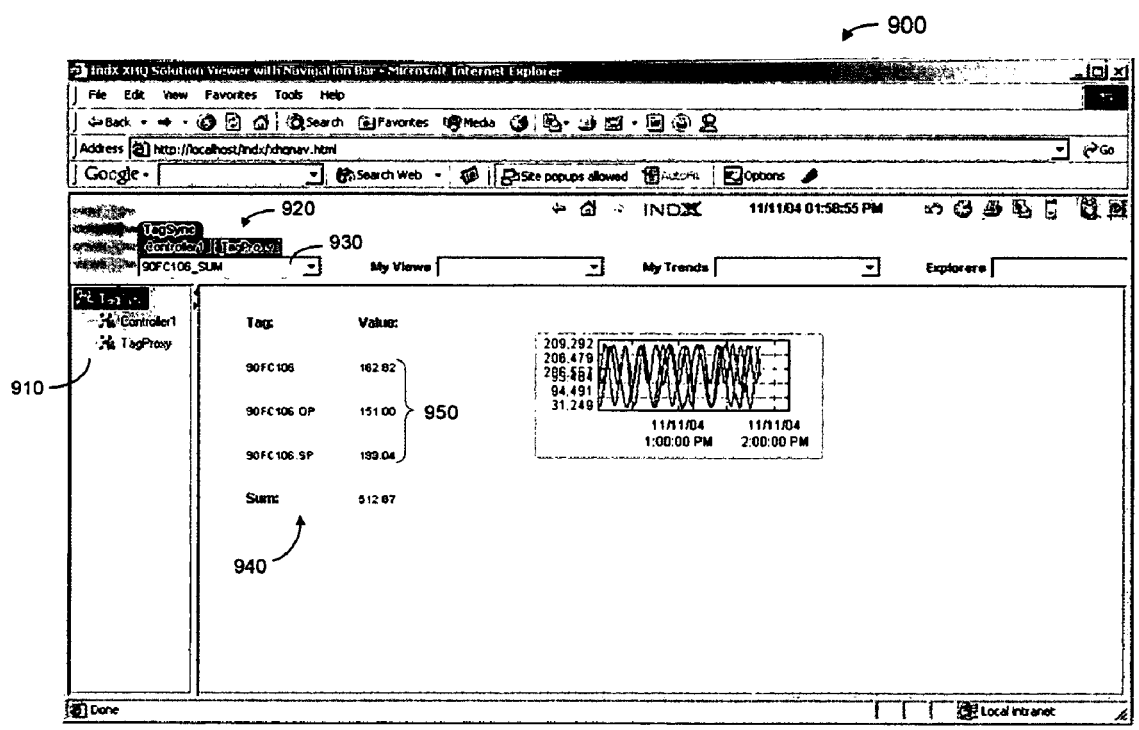
FIG. 8 is an outward view of an interface to view data associated with component members according to some embodiments.

Client device 400 receives and displays the component model at step S808. FIG. 8 illustrates an outward view of Solution Viewer dialog 900 for displaying a component model according to some embodiments. User device 400 may execute process steps of operations data client application 42 to display dialog 900 on display 450.

Solution Viewer dialog 900 includes display area 910 for depicting a component model in a hierarchical navigation tree. Each icon and associated text string in display area 910 represents a non-tag component. The component model is also displayed using tabs 920, which may change depending on the identity of the component selected in area 910. As shown, component TagSync is associated with the Current tab because component TagSync is selected in area 910.

Returning to process steps 800, a command is received in step S810 to access data associated with a component member. The command may be received in response to user manipulation of dialog 900. For example, a user may manipulate view interface 930 to select a view associated with the selected non-tag component. According to some embodiments, a user may operate input device 440 to "right click" on a component in area 910, resulting in the display of a context menu that lists one or more views associated with the component. The user may then select one of the displayed views.

One or more views may be defined for each non-tag component of a component model. The views may be defined by administration device 300 or any other device or user of system 1. A view may include data associated with members of the selected component, as well as data associated with members of other components. It will initially be assumed that a command is received at step S810 to display a view that includes data associated with a member of a tag component. Moreover, the member is associated with a tag attribute.

User device 400 therefore determines, at step S812, that the member is associated with a tag attribute. Next, at step S814, user device 400 executes operations data client application 42 to issue a query for the data associated with the member and for the data associated with each other member of the component that is associated with a tag attribute. By way of example according to some embodiments, it will be assumed that the member is CurrentValue of the component Pressure shown in FIG. 5. Accordingly, the issued query is for data associated with the member CurrentValue and for data associated with the members Unit and Description of the component Pressure. The query is not for data associated with members hiLimit and loLimit because these members are not associated with a tag attribute.

The query is received by the server device, which subscribes to the data at step S816. Any suitable method may be used to access the data, which may reside in application environment 20, back-end environment 10, or elsewhere. According to some embodiments, enterprise server 22 passes a request for the data to a solution server 26 that is associated with the selected component. The solution server 26, as described above, uses a suitable connector to access the data from an element of back-end environment 10 that owns the data. The requested data is received by the server device at step S818.

The subscription to and reception of the data by the server device may comprise two or more transactions with back-end environment 10. That is, the server device may subscribe to all of the data using a single subscription procedure and receive all of the data using a single reception procedure, or may execute one subscription procedure and reception procedure for each component member.

The data is transmitted to client device 400 at step S820. Client device 400 receives the data at step S822 and displays the requested view based thereon at step S824. Dialog 900 shows a requested view according to some embodiments. As shown, view 940 includes data 950 associated with three different component members. The members may reflect three different instantiations of a same tag component.

In a case that the member is not associated with a tag attribute, flow proceeds from step S812 to step S826. A query for data associated with the member is issued at step S826, and the server device subscribes to the data at step S828 as described above. The subscription is related only to data associated with the single component member. The data is received at step S830 and transmitted to user device 400 at step S832, where it is received as described above at step S822.

Some embodiments of process steps 800 provide for controllable circumstances in which data associated with a member of a component is accessed automatically if data associated with another member of the component is accessed. All of the data may be accessed with a single request from browsing environment 40 to application environment 20. Such features may provide efficient access to data while maintaining satisfactory system performance.

Figure 9:
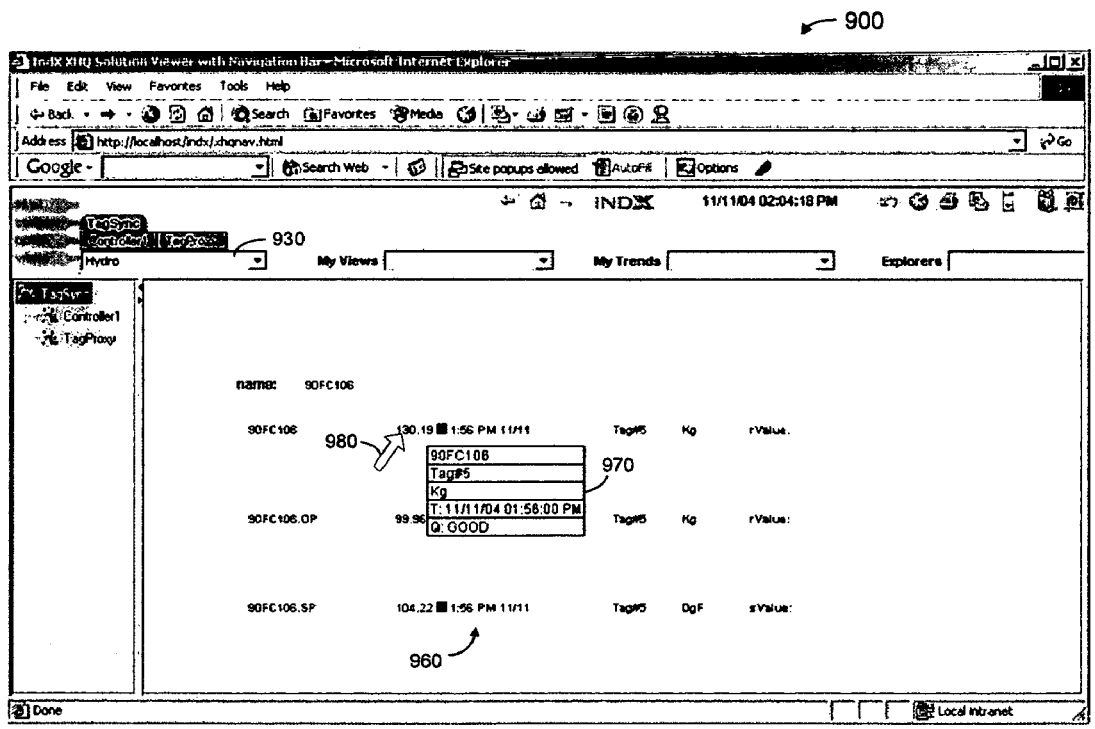
FIG. 9 is an outward view of an interface to view data associated with component members according to some embodiments.

FIG. 9 shows another view of Solution Viewer dialog 900. A new view has been selected within interface 930, resulting in the display of view 960 in dialog 900. View 960 presents data associated with the same tag component instantiations presented in view 940. Accordingly, selection of view 960 in interface 930 resulted in flow through process steps S810, S812, S814, S816, S818, S820, S822 and S824 as described above.

View 960 also shows Tooltip 970, which is displayed in response to the placement of pointer 980 on data of a component member that is associated with a Value tag attribute. Tooltip 970 shows data of other members of the component that are also associated with tag attributes. This data displayed by Tooltip 970 may be acquired by user device 400 according to process steps 800.

Figure 10:
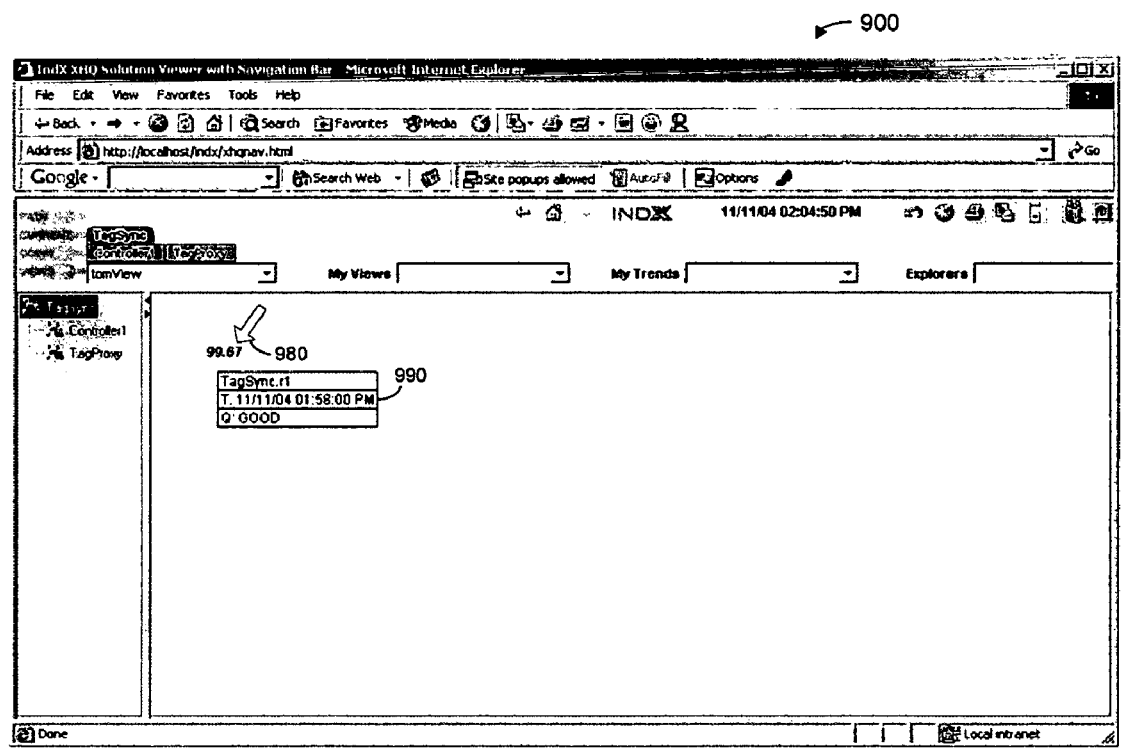
FIG. 10 is an outward view of an interface to view data associated with component members according to some embodiments.

In contrast to Tooltip 970, Tooltip 990 of FIG. 10 is displayed in response to the placement of pointer 980 on data of a component member that is not associated with a Value tag attribute. Since the component member is not associated with a tag attribute, the data associated with the component member was acquired using steps S826, S828, S830 and S832 as described above. Accordingly, data associated with other members of the subject component was not acquired and is not available to populate additional fields of Tooltip 990.

Figure 11:
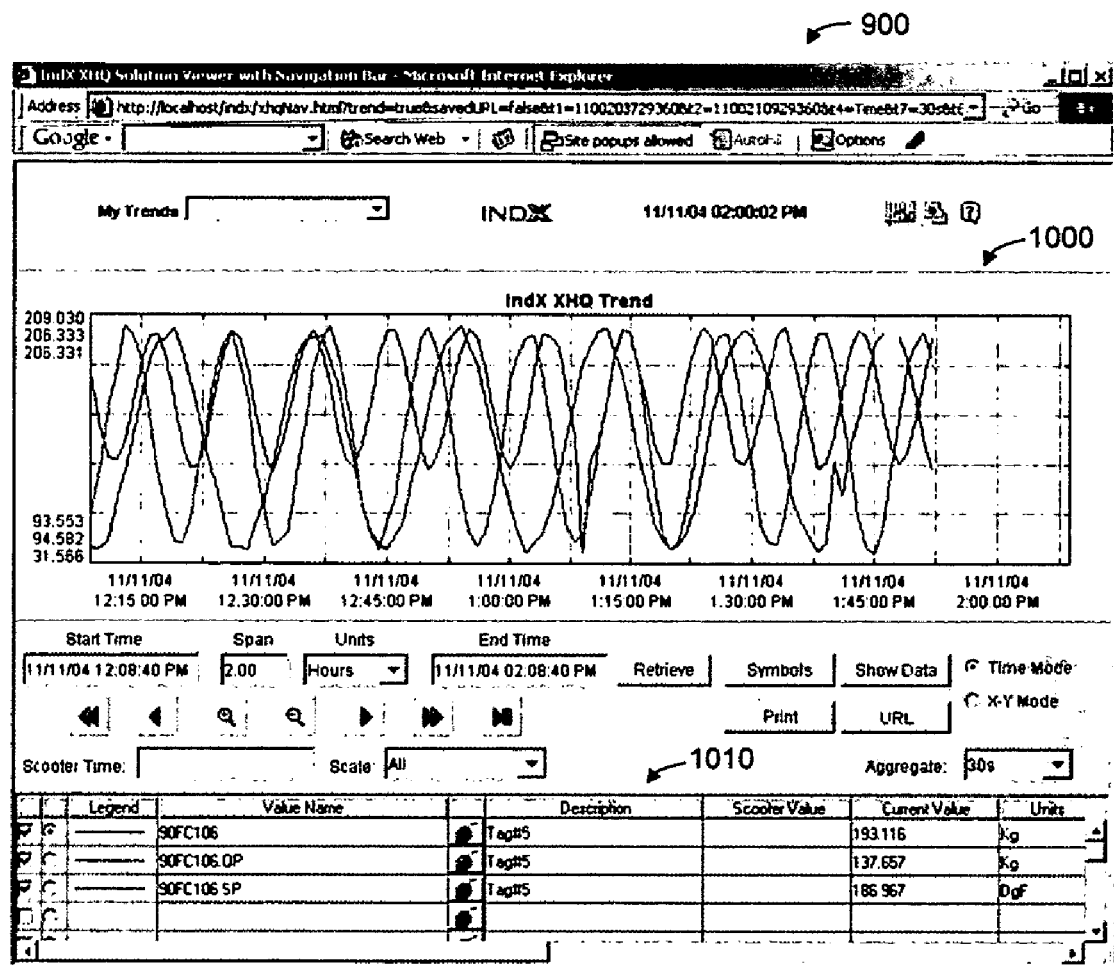
FIG. 11 is an outward view of an interface to define views of component member values according to some embodiments.

FIG. 11 shows Solution Browser dialog 900 displaying trender interface 1000. Trender interface 1000 provides a graphical display of member values over time. Trender interface 1000 provides many controls to format the graphical display in a desired manner, including component selection interface 1010.

Component selection interface 1010 allows a user to input one or more Value Names, each of which represents an instantiation of a tag component. For example, a member of a tag component may be associated with a Key tag attribute. A Value Name reflects data associated with this member in a particular instantiation of the tag component. Accordingly, a Value Name may also be referred to as a tag Key.

Component selection interface 1010 also includes areas to display data associated with a Description tag attribute, a Value tag attribute, and a Unit tag attribute for each represented component instantiation. As described above, this data may be accessed automatically upon accessing data associated with the Key tag attribute of each instantiation.

The above-described embodiments may be altered to create completely or partially different embodiments without departing from the spirit and scope of the appended claims.

What is claimed is:

1. A method comprising:

associating, by a processor, a first member of a plurality of members of a component with point data;

associating, by the processor, a second member of the plurality of members of the component with non-point data, wherein the non-point data provides context for the point data;

associating, by the processor, a first tag attribute with the first member;

associating, by the processor, a second tag attribute with the second member;

receiving, by the processor, an instruction to access data associated with the first member of the component;

in response to the instruction to access data associated with the first member of the component, determining, by the processor, whether the first member of the component is associated with a tag attribute, said determining whether the first member of the component is associated with a tag attribute resulting in a determination that the first member of the component is associated with a tag attribute; and in response to the determination that the first member of the component is associated with a tag attribute, issuing, by the processor, a query that is for data associated with the first member of the component, data associated with the second member of the component and data associated with each other member of the component that is associated with a tag attribute;

wherein the first member is not a member of the second member; and wherein the second member is not a member of the first member.

2. A method according to claim 1, wherein the first and second tag attributes comprise one or more of: a value tag attribute, a units tag attribute; a description tag attribute; a key tag attribute; a high limit tag attribute; or a low limit tag attribute.

3. A method according to claim 2, wherein each of the first and second tag attributes is associated with only one of the plurality of members.

4. A method according to claim 2, wherein the value tag attribute is associated with only one of the plurality of members.

5. A method according to claim 1, further comprising:
displaying the component in a component model.

6. A method according to claim 1, further comprising:
receiving a query for data associated with each of the plurality of members that is associated with a tag attribute; and
querying a database for the data associated with each of the plurality of members that is associated with a tag attribute.

7. A method according to claim 6, wherein querying the database for the data comprises issuing a respective query for data associated with each of the plurality of members that is associated with a tag attribute.

8. An apparatus comprising:
a memory;
a processor in communication with the memory; and
a display to display a user interface in response to commands issued by the processor, the user interface comprising:
 a member interface to associate a first member of a plurality of members of a component with point data, and to associate a second member of the plurality of members of the component with non-point data, wherein the non-point data provides context for the point data; and
 a tag attribute interface to associate a first tag attribute with the first member, and to associate a second tag attribute with the second member;
the processor to:
 receive an instruction to access data associated with the first member of the component;
 in response to the instruction to access data associated with the first member of the component, determine whether the first member of the component is associated with a tag attribute, said determine whether the first member of the component is associated with a tag attribute resulting in a determination that the first member of the component is associated with a tag attribute; and
 in response to the determination that the first member of the component is associated with a tag attribute, issue a query that is for data associated with the first member of the component, data associated with the second member of the component and data associated with each other member of the component that is associated with a tag attribute;
wherein the first member is not a member of the second member; and
wherein the second member is not a member of the first member.

9. An apparatus according to claim 8, wherein the first and second tag attributes comprise one or more of: a value tag attribute, a units tag attribute; a description tag attribute; a key tag attribute; a high limit tag attribute; or a low limit tag attribute.

10. An apparatus according to claim 9, wherein each of the first and second tag attributes is to be associated with only one of the plurality of members.

11. An apparatus comprising:
a memory storing processor-executable process steps; and
a processor in communication with the memory and operative in conjunction with the stored process steps to:
associate a first member of a plurality of members of a component with point data;
associate a second member of the plurality of members of the component with non-point data, wherein the non-point data provides context for the point data;
associate a first tag attribute with the first member;
associate a second tag attribute with the-second member;
receive an instruction to access data associated with the first member of the component;
in response to the instruction to access data associated with the first member of the component, determine whether the first member of the component is associated with a tag attribute, said determine whether the first member of the component is associated with a tag attribute resulting in a determination that the first member of the component is associated with a tag attribute; and
in response to the determination that the first member of the component is associated with a tag attribute, issue a query that is for data associated with the first member of the component, data associated with the second member of the component and data associated with each other member of the component that is associated with a tag attribute;
wherein the first member is not a member of the second member; and
wherein the second member is not a member of the first member.

12. An apparatus according to claim 11, wherein the first and second tag attributes comprise one or more of: a value tag attribute, a units tag attribute; a description tag attribute; a key tag attribute; a high limit tag attribute; or a low limit tag attribute.

13. An apparatus according to claim 12, wherein each of the first and second tag attributes is associated with only one of the plurality of members.

14. An apparatus according to claim 12, wherein the value tag attribute is associated with only one of the plurality of members.

15. An apparatus according to claim 11, the processor further operative in conjunction with the stored process steps to:
receive a query for data associated with each of the plurality of members that is associated with a tag attribute; and
query a database for the data associated with each of the plurality of members that is associated with a tag attribute.

16. An apparatus according to claim 15, wherein querying the database for the data comprises issuing a respective query for data associated with each of the plurality of members that is associated with a tag attribute.

17. An apparatus comprising:
a memory storing processor-executable process steps, the processor-executable process steps comprising:
 a step to associate a first member of a plurality of members of a component with point data;
 a step to associate a second member of the plurality of members of the component with non-point data, wherein the non-point data provides context for the point data;
 a step to associate a first tag attribute with the first member;
 a step to associate a second tag attribute with the second member;
 a step to receive an instruction to access data associated with the first member of the component;

a step to, in response to the instruction to access data associated with the first member of the component, determine whether the first member of the component is associated with a tag attribute, said determine whether the first member of the component is associated with a tag attribute resulting in a determination that the first member of the component is associated with a tag attribute; and a step to, in response to the determination that the first member of the component is associated with a tag attribute, issue a query that is for data associated with the first member of the component, data associated with the second member of the component and data associated with each other member of the component that is associated with a tag attribute;

wherein the first member is not a member of the second member; and wherein the second member is not a member of the first member.

18. An apparatus according to claim 17, wherein the one or more tag attributes comprise one or more of: a value tag attribute, a units tag attribute; a description tag attribute; a key tag attribute; a high limit tag attribute; or a low limit tag attribute.

19. An apparatus according to claim 18, wherein each of the first and second tag attributes is associated with only one of the plurality of members.

20. An apparatus according to claim 18, wherein the value tag attribute is associated with only one of the plurality of members.

21. An apparatus according to claim 17, the process steps further comprising:

a step to receive a query for data associated with each of the plurality of members that is associated with a tag attribute; and a step to query a database for the data associated with each of the plurality of members that is associated with a tag attribute.

22. An apparatus according to claim 21, wherein the step to query the database for the data comprises a step to issue a respective query for data associated with each of the plurality of members that is associated with a tag attribute.

23. A method according to claim 1, wherein the point data comprises a numerical value produced by at least one of: a gauge and monitor.

24. A method according to claim 23, wherein the non-point data comprises a unit characterizing the numerical value.

25. A method according to claim 23, wherein the non-point data comprises a limit characterizing the numerical value.

26. A method according to claim 24, wherein the component is a pressure component or a speed component.

27. A method according to claim 25, wherein the component is a pressure component or a speed component.

28. A method according to claim 26, wherein the point data is a numerical value produced by a gauge.

29. A method according to claim 27, wherein the point data is a numerical value produced by a monitor.

30. A method according to claim 28, further comprising associating a third member of the plurality of members of the component with non-point data, wherein the non-point data associated with the third member comprises a limit that provides context for the point data.

31. A method according to claim 30, further comprising associating a fourth member of the plurality of members of the component with non-point data, wherein the non-point data associated with the fourth member comprises a limit that provides context for the point data.

32. A method according to claim 31, further comprising associating a fifth member of the plurality of members of the component with non-point data, wherein the non-point data associated with the fifth member comprises a description that provides context for the point data.

33. A method according to claim 1, further comprising associating a member type and a value tag attribute with the first member.

34. A method according to claim 23, further comprising associating a member type and a value tag attribute with the first member.

35. A method according to claim 24, further comprising associating a member type and a value tag attribute with the first member.

36. A method according to claim 25, further comprising associating a member type and a value tag attribute with the first member.

37. A method according to claim 26, further comprising associating a member type and a value tag attribute with the first member.

38. A method according to claim 30, further comprising associating a member type and a value tag attribute with the first member.

39. A method according to claim 1, further comprising:
determining whether the first member is associated with a tag attribute.

40. A method according to claim 1, wherein the first tag attribute comprises a value tag attribute and wherein the second tag attributes comprise one or more of: a description tag attribute; a key tag attribute; a high limit tag attribute; or a low limit tag attribute.

41. A method according to claim 1, wherein the second tag attributes comprises one or more of: a high limit tag attribute; or a low limit tag attribute.

42. A method according to claim 1, wherein the first tag attribute is not associated with the second member and wherein the second tag attribute is not associated with the first member.

43. An apparatus comprising:
a data storage device storing processor-executable process steps, the processor-executable process steps comprising:

a step to associate a first member of a plurality of members of a component with point data;

a step to associate a second member of the plurality of members of the component with non-point data, wherein the non-point data provides context for the point data;

a step to associate a first tag attribute with the first member;

a step to associate a second tag attribute with the second member;

a step to receive an instruction to access data associated with the first member of the component;

a step to, in response to the instruction to access data associated with the first member of the component, determine whether the first member of the component is associated with a tag attribute, said determine whether the first member of the component is associated with a tag attribute resulting in a determination that the first member of the component is associated with a tag attribute; and a step to, in response to the determination that the first member of the component is associated with a tag attribute, issue a query that is for data associated with the first member of the component, data associated with the second member of the component and data associated with each other member of the component that is associated with a tag attribute;

wherein the first member is not a member of the second member; and wherein the second member is not a member of the first member.

44. A method according to claim 1, wherein issuing, by the processor, a query that is for data associated with the first member of the component, data associated with the second member of the component and data associated with each other member of the component that is associated with a tag attribute comprises:

issuing, by the processor, a query that is for data associated with the first member of the component, data associated with the second member of the component and data associated with each other member of the component that is associated with a respective tag attribute.

45. A method according to claim 1, wherein issuing, by the processor, a query that is for data associated with the first member of the component, data associated with the second member of the component and data associated with each other member of the component that is associated with a tag attribute comprises:

issuing, by the processor, a query that is for data associated with the first member of the component, data associated with the second member of the component and data associated with each other member of the component that is associated with a tag attribute and not for data associated with any member of the component that is not associated with a tag attribute.

46. A method according to claim 1, wherein issuing, by the processor, a query that is for data associated with the first member of the component, data associated with the second member of the component and data associated with each other member of the component that is associated with a tag attribute comprises:

issuing, by the processor, a query that is for data associated with the first member of the component, data associated with the second member of the component and data associated with each other member of the component that is associated with a respective tag attribute and not for data associated with any member of the component that is not associated with a tag attribute.

* * * * *